United States Patent [19]

Bettini et al.

[11] 3,768,752

[45] Oct. 30, 1973

[54] TAPE FEED AND CONTROL FOR CHARACTER RECOGNITION DEVICE

[75] Inventors: Giuseppe Bettini, Ivrea; Dario Bisone, Montalto Dora, both of Italy

[73] Assignee: Ing. C. Olivetti & C. S.p.A., Ivrea (Torino), Italy

[22] Filed: Apr. 5, 1972

[21] Appl. No.: 241,186

[30] Foreign Application Priority Data

Apr. 5, 1971 Italy .............................. 68134 A/71

[52] U.S. Cl. .................... 242/185, 226/95, 226/118, 242/206

[51] Int. Cl.. G11b 15/06, G11b 15/58, G11b 23/12

[58] Field of Search ........................ 242/182–185; 226/95, 97, 118, 119

[56] References Cited

UNITED STATES PATENTS

| | | | |
|---|---|---|---|
| 2,952,010 | 9/1960 | Demer et al. | 242/185 X |
| 3,156,423 | 11/1964 | Potter et al. | 242/185 |

*Primary Examiner*—Leonard D. Christian
*Attorney*—Kevin McMahon et al.

[57] ABSTRACT

A tape feeding mechanism for unwinding tape from a roll, passing it at high speed past a reading station, and re-winding it on a spool, is disclosed. The device includes an inclined starting belt which keeps the tape against a reference wall, entrainment belts which are kept in position by control guides and a re-wind spool which is surrounded by movable guiding jaws. There are further disclosed an operable and closeable buffer space into which the tape is deflected during the initial stages of re-winding so as to form a reserve loop and a mechanism for marking the tape at selected locations during the run.

8 Claims, 7 Drawing Figures

TAPE FEED AND CONTROL FOR CHARACTER RECOGNITION DEVICE

BACKGROUND OF THE INVENTION

The invention relates to mechanisms for transporting tape from one spool to another at high velocity. Devices of this type are generally related to various types of character recognition apparatuses of which the tape transport mechanism, in general, forms an important element.

In known devices for the recognition of characters the tape feeding mechanisms have the disadvantage of feeding the tape at a speed considerably less than that with which the tape can be read by reading members, whereby the speed of operation in such devices is limited by the feeding speed.

SUMMARY OF THE INVENTION

The invention resides in a device for feeding a tape information carrier, which comprises a loading station for receiving a roll of tape, a staring and alignment unit, a conveyance unit and a re-winding station, in which the conveyance unit includes at least one closed loop entrainment belt capable, through friction, of conveying the tape from the starting and alignment unit to the re-winding station along a tape run which is substantially rectilinear. Each entrainment belt is perforated with a plurality of holes arranged in orderly manner along a plurality of parallel circumferential rows; a vacuum chamber adapted to create a depression on the inner face of the belt is in the region of the said rectilinear run and functions to keep the tape adhering to the belt through the effect of the suction through the holes. In order to keep the belt and tape perfectly flat, the vacuum chamber includes at least one rectilinear control bar adapted to support the part of the belt which rests thereon, whilst at the sides of each belt, and perpendicular thereto, there are arranged guide plates having rectilinear edges coplanar with the belt so that the rectilinear edges define a sliding plane for the tape.

The invention also includes a feeding device which provides for the alignment of the tape both before and after the reading station, so that during the crossing of this latter the tape is constantly aligned with regard to a predetermined alignment surface.

In accordance with another aspect of the invention, there is provided a starting and alignment unit which includes two guide plates arranged substantially parallel and between which there is inserted and runs the tape and which includes a closed loop starting belt adapted to rotate continually with a run thereof coplanar with one of the guide plates so as to accelerate the tape by acting through friction on one face of it to feed it towards the conveyance unit. A driven roller is opposed to the belt with regard to the tape and develops, through the effect of the pressure exerted on the opposite face of said tape, a frictional force between the belt and the tape sufficient to cause the advance of the tape. Furthermore, a third guide is arranged orthogonally to the first two to act as reference wall during the alignment of the tape, the belt has its longitudinal axis inclined with regard to the longitudinal axis of the guide plates so as to supply to the tape a component of thrust towards the reference wall and the driven roller is mounted so that its axis of rotation can tilt to different orientations under the influence of the coupling through friction with the tape.

Furthermore, the invention includes re-winding means so that, in the starting phase of the feeding of the tape, the leading end of the tape can automatically be re-wound about a re-winding spool.

In accordance with another aspect of the invention, there is provided a re-winding station which includes a buffer space, defined by two plates mutually parallel and orthogonal to the direction of conveyance of the tape. The tape is directed into the buffer space to form a reserve loop after having left the conveyance unit and a first photoelectric unit is arranged to detect the presence of the loop of tape having a predetermined length in the buffer space in order to command the rotation of a cylindrical re-winding spool for the tape. The re-winding is accomplished by a control member adapted to dispose two tape-guide jaws around the re-winding spool during a starting phase in order to guide the re-winding of the tape and adapted at the same time to position a deflector parallel in the direction of conveyance of the tape in order to prevent the tape entering the buffer space, so that the leading end of the tape winds itself on the spool following a substantially rectilinear course.

The invention will be described in more detail, by way of example, with reference to the accompanying drawings.

DESCRIPTION OF THE PREFERRED EMBODIMENT

The apparatus for the recognition of characters, which comprises the tape feeding device according to the invention, is intended for the automatic reading of the numbers or other symbols printed on tape by, for example, calculating machines, accounting machines, or cash-registers. The output signals of the character recognizer can be sent directly to a computer or recorded on magnetic tape or other recording media.

Figure 1:
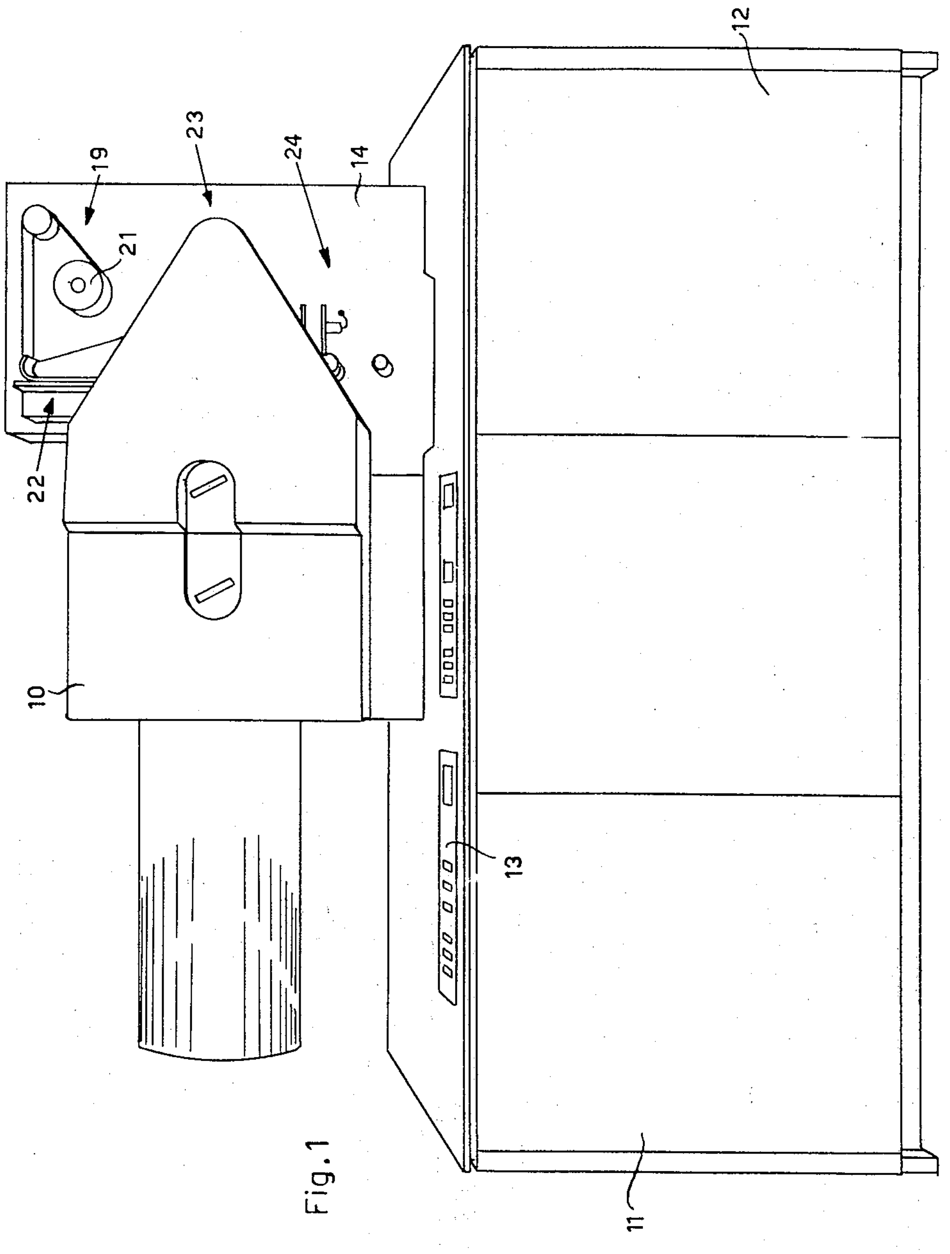
FIG. 1 is a perspective front view of an apparatus for the recognition of characters which includes a device according to the invention.
Figure 2:
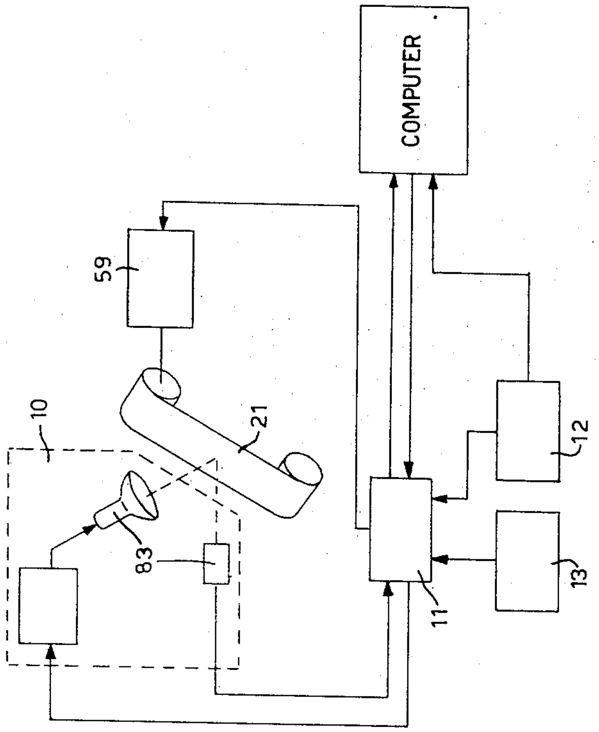
FIG. 2 is a general block diagram of a character recognition device.

FIGS. 1 and 2 generally depict the main elements of the recognition device; apart from the tape feeding unit, these elements include: a scanning reading unit 10, a logical recognition unit 11, an operation control unit 12, and a programming panel 13; the reading unit can be, for example, of the type described in the specification of our U.S. Pat. application Ser. No. 96,931 filed on Dec. 10, 1970, now U.S. Pat. No. 3,715,724.

Figure 3:
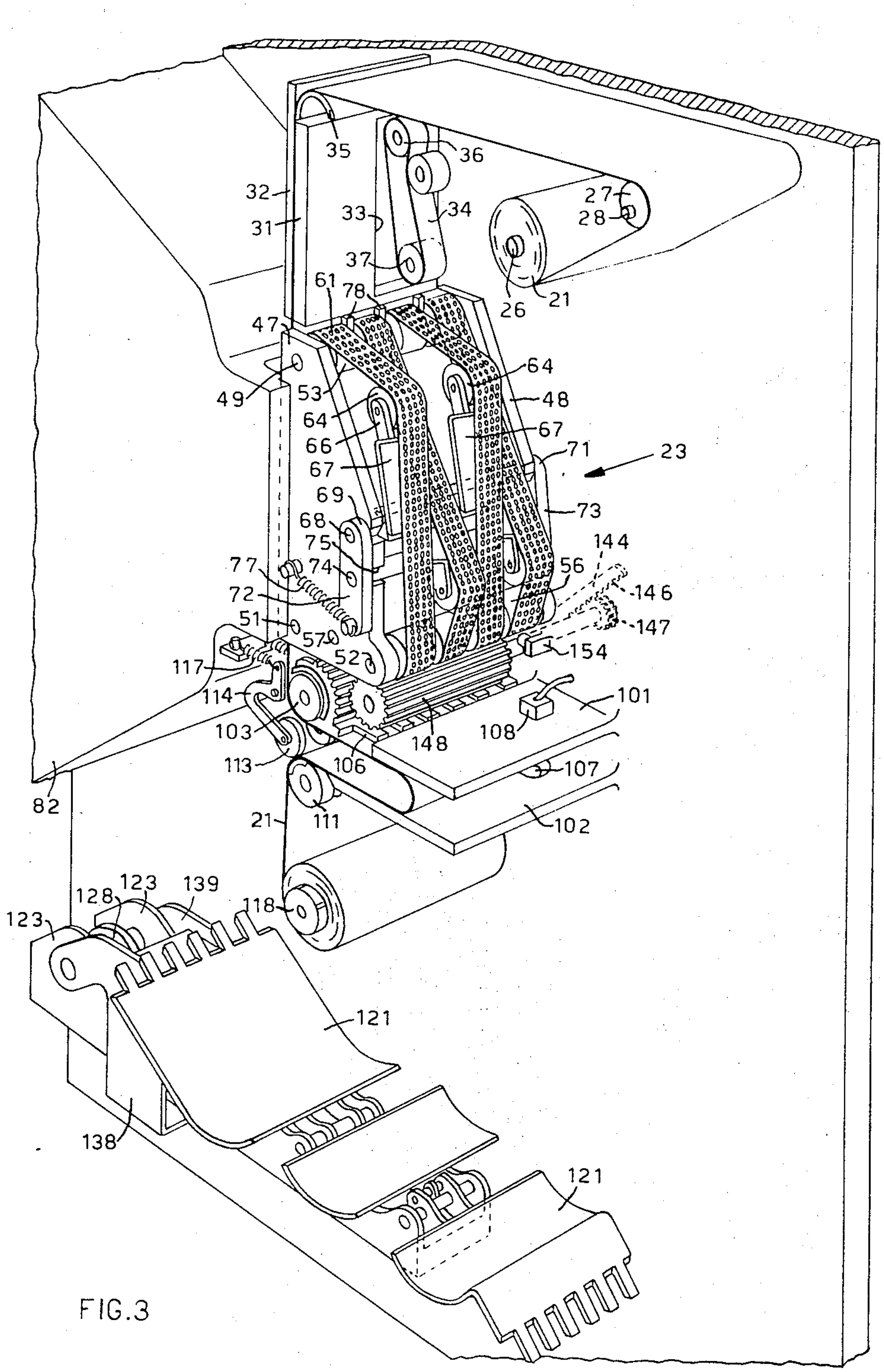
FIG. 3 is a perspective view of the tape feeding device according to the invention.
Figure 4:
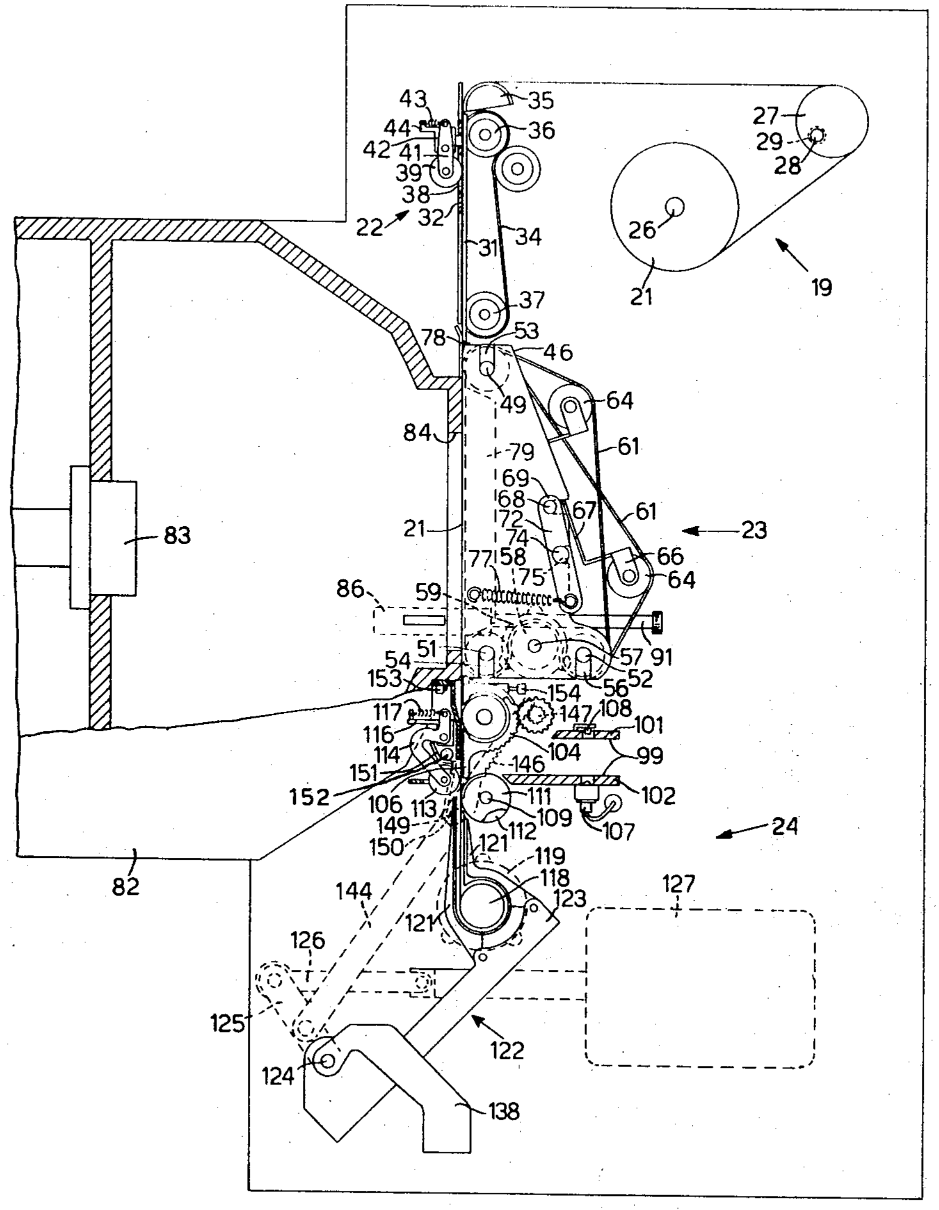
FIG. 4 is a front view of feeding device of FIG. 3.

Referring to FIG. 1 and especially to FIGS. 3 and 4: the device for the feeding of a tape information carrier comprises a base 14, constituted by a substantially vertical plate capable of supporting a loading station 19, a starting and alignment unit 22, a conveyance unit 23 and a re-winding station 24.

The starting and alignment unit 22, the conveyance unit 23 and the re-winding station 24 are arranged in succession along a course which develops in a substantially vertical direction.

The loading station 19 comprises a spindle 26, projecting horizontally from the plate 14 and on which there is placed a roll of tape 21 printed with the characters to be read. The loading station 19 also includes a plastic cylinder 27 mounted eccentrically on a pin 28 supported by the plate 14. The cylinder 27 is connected to the pin 28 by means of a torsion spring, generally indicated at 29 in FIG. 4, which allows the cylinder to oscillate elastically about the pin 28.

The starting and alignment unit 22 comprises two vertical guide plates 31 and 32, arranged substantially parallel to each other and perpendicular to the base plate 14 which supports them; tape 21 runs through and is guided by plates 31 and 32. In the central part of the guide 31 there is cut out a space 33 (FIG. 3) in which there is housed a closed loop advance belt 34 continually rotating on two pulleys 36 and 37. To facilitate the introduction of the tape 21 between the guides 31 and 32, plate 31 ends at the top in a rounded lip 35.

The advance belt 34 has a rectilinear stretch coplanar with the guide 31 so as to accelerate the tape 21 by acting through friction on one face of it; the longitudinal axis of the belt is inclined with regard to the longitudinal or vertical axis of the guides 31 and 32. This inclination furnishes the tape 21 with a component of thrust towards the plate 14, the plate thereby acting as a reference wall for the alignment of the tape 21.

In a space 38 (FIG. 4) of the guide 32, opposite the belt 34 with regard to the tape 21, there is housed a driven roller 39 pivoted at the end of a lever 41 fulcrumed on a block 42 which in its turn is pivoted on the guide 32. A spring 43, stretched between the lever 41 and a tongue 44 of the block 42,keeps the roller 39 pressed against the guide 31. The roller 39 is capable of developing on the opposed face of the tape 21 a frictional force between the belt 34 and the tape sufficient to cause the advance of the tape.

Since the block 42 is free to orientate itself about its own axis (a horizontal axis in the plane of the paper in FIG. 4) the roller 39 can follow the possible transverse displacements of the tape 21 when it is moved against the reference wall 14 by the belt 34 and the roller can arrange itself parallel to the wall 14 when the tape 21 is aligned.

Beneath the starting and alignment unit 22 there is arranged the conveyance unit 23 which includes, as a frame, the two plates 47 and 48 (FIG. 3) which are parallel to each other and shaped so as to have one side substantially aligned with the guide 31.

Between the plates 47 and 48 there are arranged three shafts 49, 51 and 52, each of which supports four driven rollers 53, 54 and 56 respectively. Between the shafts 51 and 52, and also supported by the plate 47 and 48, there is arranged a shaft 57, on which there are keyed four driving rollers 58. The shaft 57 is driven by a motor which is behind the plate 14 and generally indicated at 59.

Around the driven rollers 53, 54 and 56 there are arranged four closed loop entrainment belts 61 which are brought into rotation by the driving rollers 58, each of which acts through friction on the rollers 54, 56. The belts 61 convey the tape 21 from the starting and alignment unit 22 to the rewinding station 24.

The belts 61 are stretched by tensioning rollers 64; the four rollers 64, which for convenience of mounting are arranged staggered with each other, are each mounted on a fork 66 of leaf spring 67, which is fixed to a single shaft 68. The shaft is supported by the ends 69 and 71 of two levers 72 and 73 and fulcrumed by a pin 74 in slots 75 in the plates 47 and 48. The levers 72 and 73 keep the rollers 64 constantly pressed against the inner surfaces of the belts 61 through the action of two springs 77, of which only one is visible in FIGS. 3 and 4.

At the sides of each belt 61 there are arranged guide plates 78 (FIG. 7) having rectilinear edges coplanar with the belts 61 in the rectilinear vertical run thereof and extending over the whole length of this run; the rectilinear edges of the guides 78 define a sliding plane for the tape 21.

Figure 7:
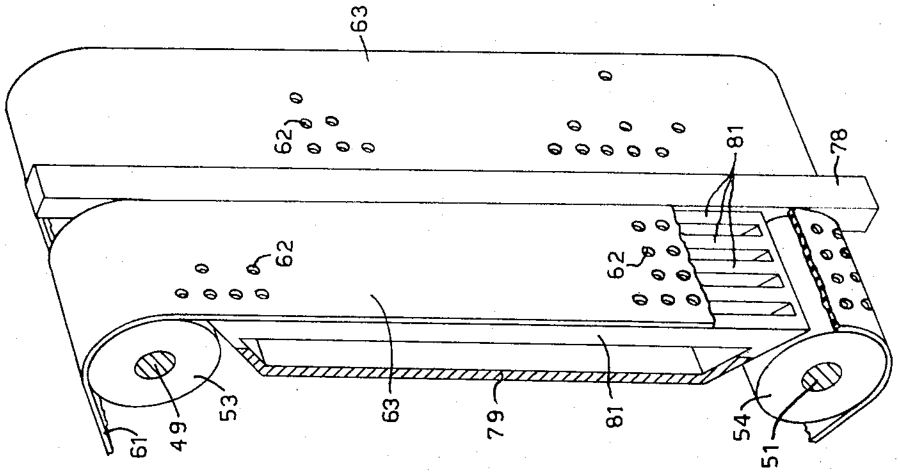
FIG. 7 is a partially sectioned perspective view of the conveyance unit showing the guides and control bars.

As seen in FIG. 7, behind the belts 61, there is arranged a vacuum chamber 79; a suitable vacuum pump is used to create a depression on the inner face of each belt 61 thereby keeping the tape 21 adhering to the belts 61 through the effect of the suction effected through holes 62. The holes 62 are arranged in four circumferential rows around each belt; the holes are so positioned so that control bars 81 do not block any of the holes at any time during the run. The rectilinear control bars 81 keep the belts flat; there is no danger that the inner regions of the belts will flutter or be bowed inward during the run.

Opposite the conveyance unit 23 with regard to the tape 21 there is the reading unit 10 (FIG. 1) which includes a metal housing 82 (FIGS. 3 and 4) supported by the base 14 and inside which there is arranged a scanning member 83 (FIG. 4).

In the box 82, opposite the vertical rectilinear run of the belts 61, there is cut out a viewing window 84, in front of which the tape 21 passes in order to be viewed by the scanning member 83.

Figure 5:
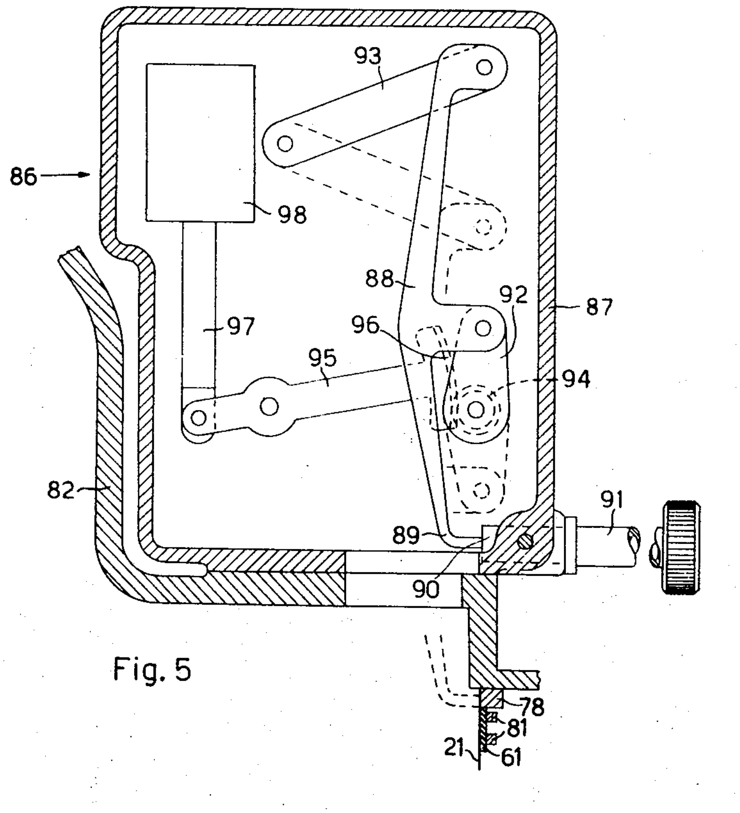
FIG. 5 is a partially sectioned plan view of a device for marking the tape as it passes through the feeding device.

External to box 82 and supported by the latter, at the lower end of the viewing window 84, there is arranged a marking member 86 (FIGS. 4 and 5) capable of printing selectively a particular graphic symbol on the tape 21 along one of its edges. The marking member 86 comprises a container 87 inside which there is arranged a rod 88 bearing at one end a writing pen 89 which, in the position of rest, rests against the end 90 of the inked felt plug housed inside a tube 91. The rod 88 is controlled by means of two levers 92 and 93, the first of which bears an integral toothed wheel 94. A third lever 95 carrying a rack 96 connects the toothed wheel 94 to an armature 97 of an electromagnet 98.

Below the conveyance unit 23 there is arranged the rewinding station 24 (FIGS. 3 and 4) which comprises a buffer space 99 (FIG. 4) defined by two parallel plates 101 and 102 which are orthogonal to the direction of conveyance of the tape 21 and to the plate 14 which supports them. In the proximity of the entrance of the buffer space 99 there is arranged a deviator roller 103 continually rotating and provided peripherally with a plurality of holes through which a vacuum is exerted.

Concentrically to the roller 103 there is arranged a toothed rim 104 provided with a deflector 106 which, in the position of rest, is arranged coplanar to the plate 101.

Between the plates 101 and 102 there is arranged a photoelectric unit constituted by a lamp 107 and by a phototransistor 108 capable of detecting the presence of a loop of tape 21 having a predetermined length in the buffer space 99.

Seven tension rollers 111, having surfaces with a high coefficient of friction, are arranged below the deviator roller 103; the rollers are substantially tangent to the upper plane of the plate 102 and are mounted on a shaft 109.

The rollers 111 are vertically mounted; there is, however, one roller at the far end of the shaft 109 which is inclined slighly from the vertical, thereby imparting a component of thrust toward the base wall 14. This inclined roller assures that the tape will remain referenced with one edge along the base wall.

Opposite the tension rollers 111 there are arranged eight counter-rollers 113, each of which is supported by the lower end of a lever 114 hinged on a block 116 which is fixed to the base 14 and is pressed against the rollers 111 and 112 by spring 117.

Below the rollers 111 and 112 and perpendicular to the plate 14, there is arranged a spool 118 for the re-winding of the tape 21; the spool is driven by a motor generally indicated at 119 in FIG. 4 which is arranged behind the plate 14.

Figure 6:
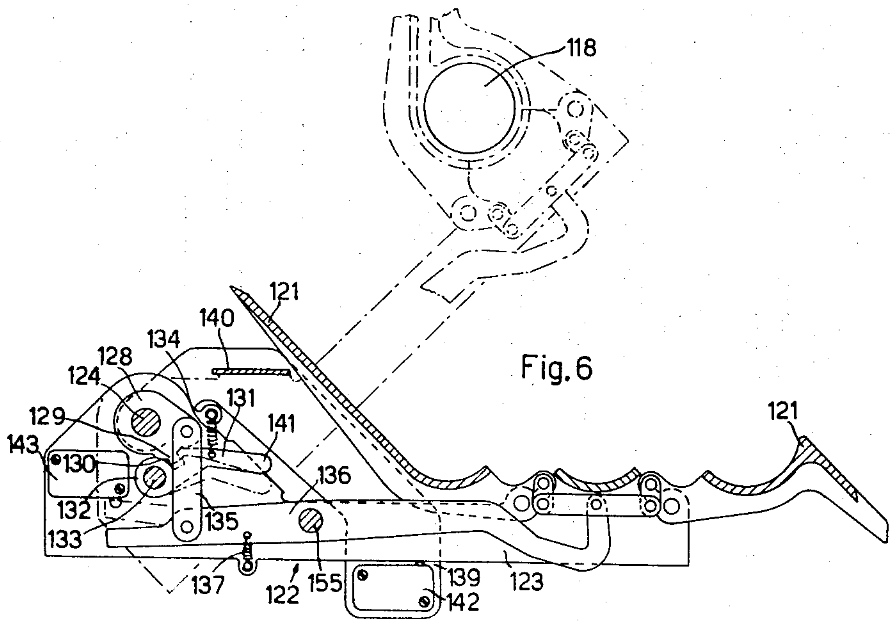
FIG. 6 is a partially sectioned view of re-winding jaws of the feeding device.

Two rounded tape-guide jaws 121 (FIGS. 3, 4 and 6) can be placed around the spool 118 in the starting phase of the feeding of the tape 21 by an actuating member 122; the actuating member has two parallel lifting plates 123 which are mounted to a driving shaft 124 which is driven by two levers 125 and 126. A control member 127 is arranged behind the plate 14 and drives the levers 125 and 126; the control member is a solenoid.

The tape-guide jaws 121 are hinged on the lifting plates 123 and are driven by a command transmission system which is actuated by the driving shaft 124; the transmission system includes an actuator arm 128 (FIG. 6) keyed on the shaft 124 and provided with a tooth 129 which 123 cavity 130 of a locking lever 131, the locking lever is fulcrumed at one end 132 on a pin 133 which is integral with the lifting plates 123 and constantly drawn into the locking position by a spring 134. A rod 135 connects the actuating arm 128 to the end of a control lever 136 fulcrumed on a pin 155 supported by the lifting plates 123; the rod commands the closure positioning of the jaws 121 around the re-winding spool 118. In the position of rest a spring 137 stretched between the control lever 136 and the lifting plates 123, keeps the jaws 121 open. Between two support plates 138 and 139, there is arranged a fixed bar 140 which, by acting on the other end 141 of the locking lever 131, causes the release of the locking.

A first microswitch 142, mounted between the support plates 138 and 139, is actuated by the lifting plates 123 when they are completely lowered. A second microswitch 143, mounted between the lifting plates 123, is actuated by the control lever 136 when it has completely executed the positioning of the tape-guide jaws around the re-winding spool 118.

An arm 144 is hinged on the lever 125 (FIG. 4); the arm has a rack 146 which meshes with a toothed wheel 147 coaxial to a toothed roller 148 which meshes with the toothed rim 104. A pin 149 of the arm 144 collaborates with a lower part 150 of a control bar 151 which is fulcrumed on a pin 152 and collaborating at its upper part with the levers 114.

A second photoelectric unit, constituted by a lamp 153 and by a phototransistor 154, is arranged between the conveyance unit 23 and the deviator roller 103; the unit detects the passage of the tape 21.

The operation of the apparatus is as follows. In the position of rest, the solenoid 127 is not actuated and keeps the actuating member 122 lowered and the tape-guide jaws 121 open; the arm 144 is shifted upwards and keeps the deflector 106 in the horizontal position and coplanar with the plate 101. In this position the counter-rollers 113, through the action of the springs 117, are kept in contact with the rollers 111, the control bar 151 not being locked by the pin 149 on the arm 144.

In order to read the information contained in the continuous roll of tape 21, one threads the tape on the cylindrical spindle 36 and starts the apparatus by actuating the appropriate key of the programming panel 13. The solenoid 127 is energized and thrusts the lever 126 to the left, thereby rotating shaft 124 and arm 128 in the counterclockwise direction. The arm 128, its tooth 129 being engaged in the cavity 130 of the locking lever through the action of the spring 134, with a first part of its rotation causes the lifting plates 123 to rotate and brings the tape-guide jaws 121 into the proximity of the re-winding spool 118.

When the end 141 of the lever 131 comes into contact with the bar 140, the locking lever 131, overcoming the action of the spring 134, rotates in the clockwise direction around the pin 133 until the tooth 139 is unhooked from the cavity 130. Such an unlocking occurs also when the lifting plates 123 have been brought into contact with the bar 140. With a subsequent rotation in the counterclockwise direction, the actuating arm 128, by drawing the rod 135 upwards, causes the control lever 136 to rotate in the clockwise direction which thus brings about the closure of the tape-guide jaws 121 around the re-winding spool 118.

At the same time the lever 126, moving towards the left, causes the lever 125 to rotate in a counterclockwise direction drawing the arm 144 downwards. With this displacement, the arm 144, through its rack 146 geared with the wheel 147 and through the toothed roller 148 geared with the toothed rim 104, brings the deflector 106 into the vertical position. Moreover, with the downward displacement of arm 144, the counter-rollers 113 are pulled away from the rollers 111, the pin 149 causing the control bar 151 to rotate in the clockwise direction.

When the positioning of the jaws 121 around the spool 118 is completed, the second microswitch 142 is actuated by the control lever 136, thus starting the feeding of the starting belt 34 and of the entrainment belts 61 by the action of the motors 59 and 119. In this position the re-winding station is arranged to receiver the tape 21 from the conveying unit 23 and to guide it as far as the spool 118 on which it will wind itself, guided by the jaws 121.

One then inserts the tape 21 between the guides 31 and 32 of the starting and alignment unit 22 so that the belt 34 by co-operating with the roller 39 entrains it through friction towards the reading station 10. The belt 34, being inclined, provides for the alignment of the tape 21 against the reference wall 14. From the starting and alignment unit 22 the tape passes to the conveying unit 23 where the entrainment belts 61 provide for its advance towards the continually rotating re-winding spool 118.

The phototransistor 154 detects the passage of the leading end of the tape and, after a predetermined time sufficient for the tape to wind itself for several turns about the spool 118, orders the actuation of the solenoid 127 and the stoppage of the motors 59 and 119.

The solenoid 127 thus returns to the position of rest, bringing about the opening of the jaws 121, the lowering of the actuating member 122, the rotation in a counterclockwise direction of the deflector 106 and the gripping of the tape 21 between the rollers 111 and 112 and the counter-rollers 113. When the actuating member 122 is completely lowered, one of the two lifting plates 123 actuates the first microswitch 142 which sends a signal indicating that reading can commence. During the reading phase the motor 59 is controlled solely by the scanning member 83, whilst the motor 119 is controlled by the photoelectric group constituted by the lamp 107 and by the phototransistor 108.

The scanning member 83 carries out a preliminary scanning of the tape 21 in the upper part of the viewing window 84, to detect the presence of a row of characters. In the absence of such a row, the scanning member 83 commands the advance of the tape 21 until the first row of characters appears in the upper part of the window 84. The recognition of such a row commands a further advance of the tape until such a row reaches the lower part of the viewing window 84. The scanning member 83 reads sequentially the portion of tape viewed and, when the operation is finished, commands the advance of the tape by a distance equal to the length of the viewing window 84.

When a character is not recognized by the recognition unit 11, this latter sends a control signal to the marking member 86 so that in correspondence with the row carrying the non-identified character there is printed a particular graphic symbol. The electromagnet 98 is energized and draws in the armature 97, thereby causing the lever 95 to rotate. Rack 96 geared with the toothed wheel 94, causes the lever 92 to rotate in the counterclockwise direction. The pen 98, which in the position of rest rests against the end 90 of the pad of inked felt contained inside the tube 91, prints near that edge of tape 21 the graphic symbol which it bears in relief.

The tape 21, in the region of the viewing window 84, is kept against the entrainment belts 61 through the action of the vacuum in chamber 79. The belts 61 being kept flat through the arrangement of the control bars 81, thereby causing the tape 21 to be kept flat over this run. The tape 21 through the components of thrust supplied to it by the belt 34 and by the inclined roller 111 is constantly aligned against the reference wall 14.

The lower extensions of the guides 78 (FIG. 7) prevent the tape from following the belts 61 when these pass round the rollers 54, and assure that the tape will be guided towards the re-winding station 24.

The tape 21, after having left the conveying unit 23, is deflected by the deviating roller 103 into the buffer space 99 to form a reserve loop. The re-winding spool 118 is at rest during this deflection. When the reserve loop reaches a predetermined length it interrupts the light emitted by the lamp 107 and the phototransistor 108 signals that the rotation of the re-winding spool 118 is to commence.

The advance of the tape 21 being intermittent, in order to avoid possible tearing, before the tape enters between the guides 31 and 32 of the starting and alignment unit 22, it passes over the cylinder 27 which, being connected to the pin 28 by means of the torsion spring 29, can oscillate elastically about the stem 28.

The motor 59 which effects the advance of the belts 61 and 34 has a low inertia, and since the tape 21 is kept adhering to the entrainment belts 61, the feeding device described above is capable of imparting to the tape a high velocity and considerable acceleration, and of stopping it suddenly without there being slippage between the entrainment members and the tape.

What we claim is:

1. A device for feeding an information tape comprising a station for receiving a roll of tape, a station for re-winding the tape, and an intermediate station for conveying the tape from the receiving station to the re-winding station, the re-winding station including a buffer space having at least two parallel plates which are substantially orthogonal to the run of the tape through the conveying station, the buffer receiving the tape after it has traversed the conveying station to form a reserve loop, the buffer also including a sensor to detect the presence of the reserve loop, the re-winding station further including a re-wind spool which rotates in response to a signal from said sensor and two tape-guide jaws for guiding the re-winding of the tape during a starting phase, the jaws being disposed around the re-winding spool; the re-winding station also including a deflector plate for preventing the tape from entering the buffer space when the jaws have been positioned about the re-wind spool.

2. The device according to claim 1 further including a deviator roller positioned at the entrance of the buffer space, the deviator roller having a plurality of holes through which there is exerted a depression which serves to keep the tape adhering to the roller so that the tape is deviated from the conveyance direction and into the buffer space to form said reserve loop.

3. The device according to claim 2 including a plurality of tension rollers positioned between said buffer space and said re-winding spool, said tension rollers beings fixed in a transverse row with respect to the tape; a plurality of movable counter rollers being positioned opposite said tension rollers with said tape passing between the counter and tension rollers; the movable counter rollers being withdrawn from the tension rollers during the starting phase of the feeding of the tape.

4. The device according to claim 3,wherein at least one of said tension rollers has its axis inclined with respect to the run of the tape so as to give the tape a component of lateral thrust against a reference surface.

5. A device in accordance with claim 1, wherein the tape-guide jaws are controlled by an actuating member which includes at least one lifting plate mounted to revolve about a driving shaft, the tape-guide jaws being hinged on the lifting plate, and further including a transmission system which is actuated by said driving shaft during a first part of the shaft's rotation in order to position the jaws in the proximity of the re-winding spool, the jaws being kept open and being conveyed integrally with the lifting plate, the jaws being closed about the re-winding spool during a second part of said driving shaft's rotation.

6. A device according to claim 5, wherein the transmission system includes a locking member and an unlocking member, the locking member including a locking lever fulcrumed at a first end on a pin integral with said lifting plate, the locking lever being urged into the locking position by a spring attached thereto, whilst the unlocking member includes a fixed element which acts on a second end of the locking lever, thereby causing the release of the locking, the said driving shaft bearing an integral actuating arm provided with a tooth capable of engaging with a recess of the locking lever and being connected by means of a rod to a control lever capable of effecting the closure of the tape-guide jaws around the re-winding spool.

7. A device according to claim 1 which includes a second sensor positioned beyond the conveyance unit for detecting the presence of the tape, the passage of the tape through the second sensor commands the re-opening of the jaws after a predetermined delay.

8. A device in accordance with claim 7 including a first microswitch, mounted in a fixed position, which is actuated by the lifting plate when the plate is completely lowered and further including a second microswitch mounted on the lifting plate and actuated when the tape-guide jaws have been positioned around the re-winding spool, the actuation of the second switch starting the rotation of the spool.

* * * * *